United States Patent Office 2,722,714
Patented Nov. 8, 1955

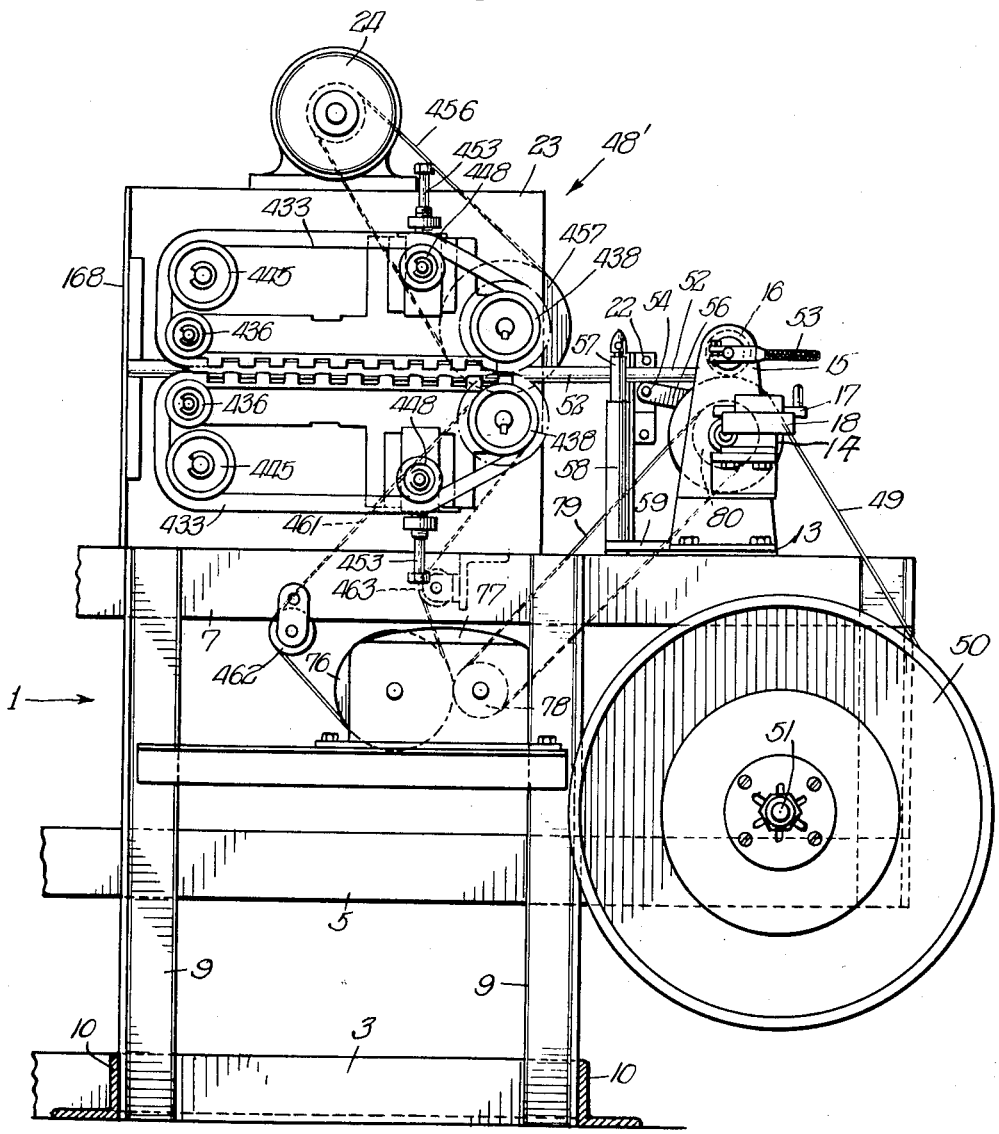

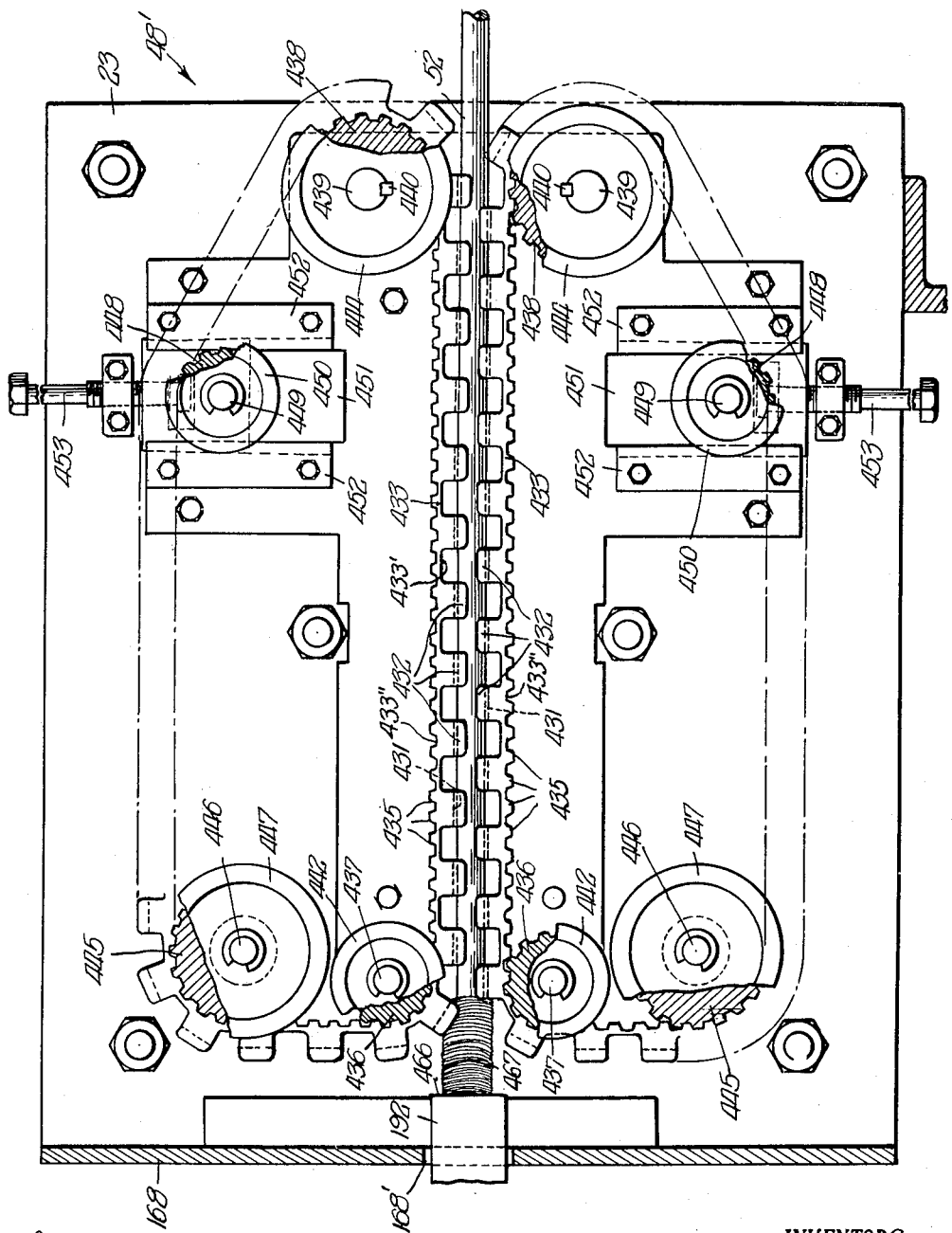

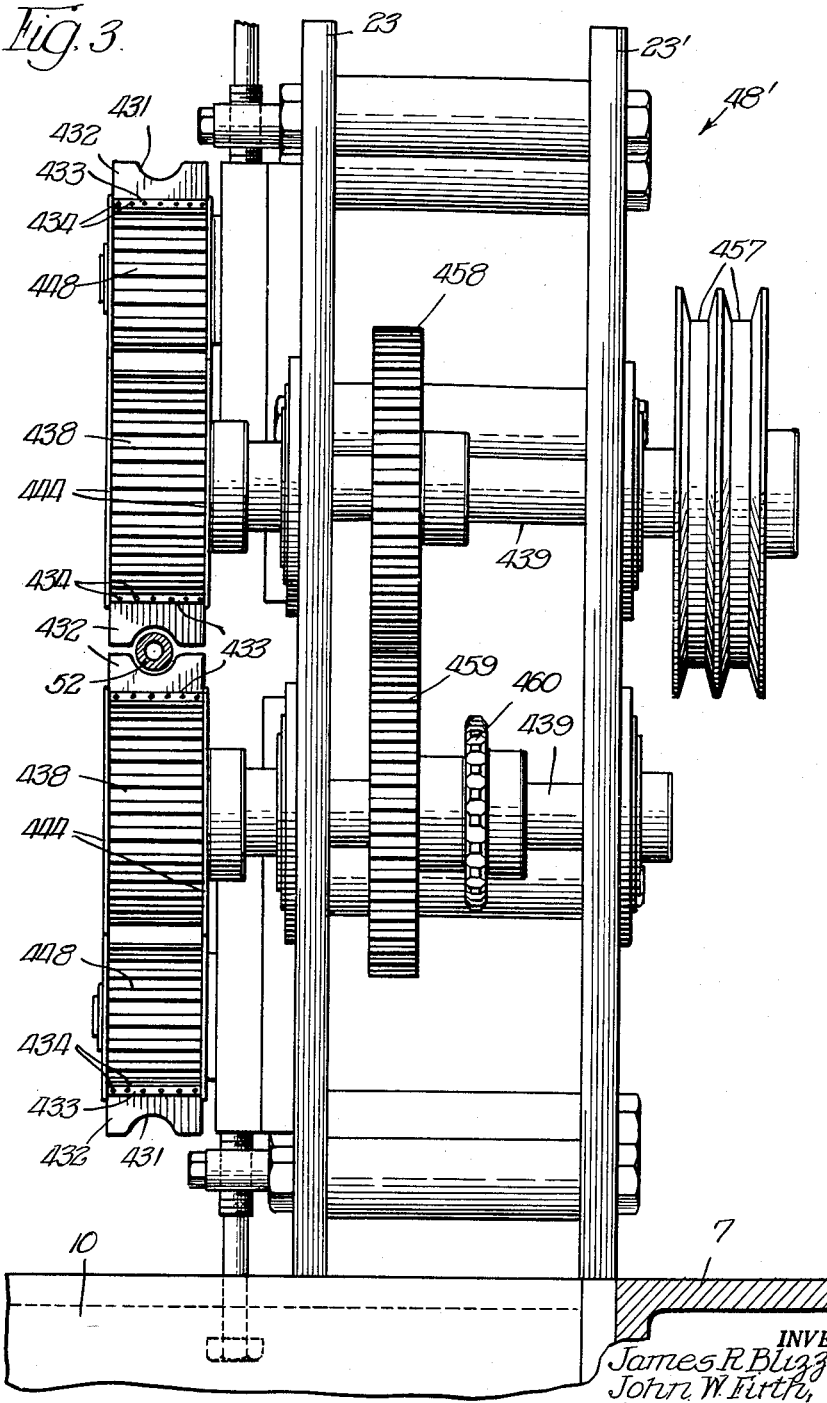

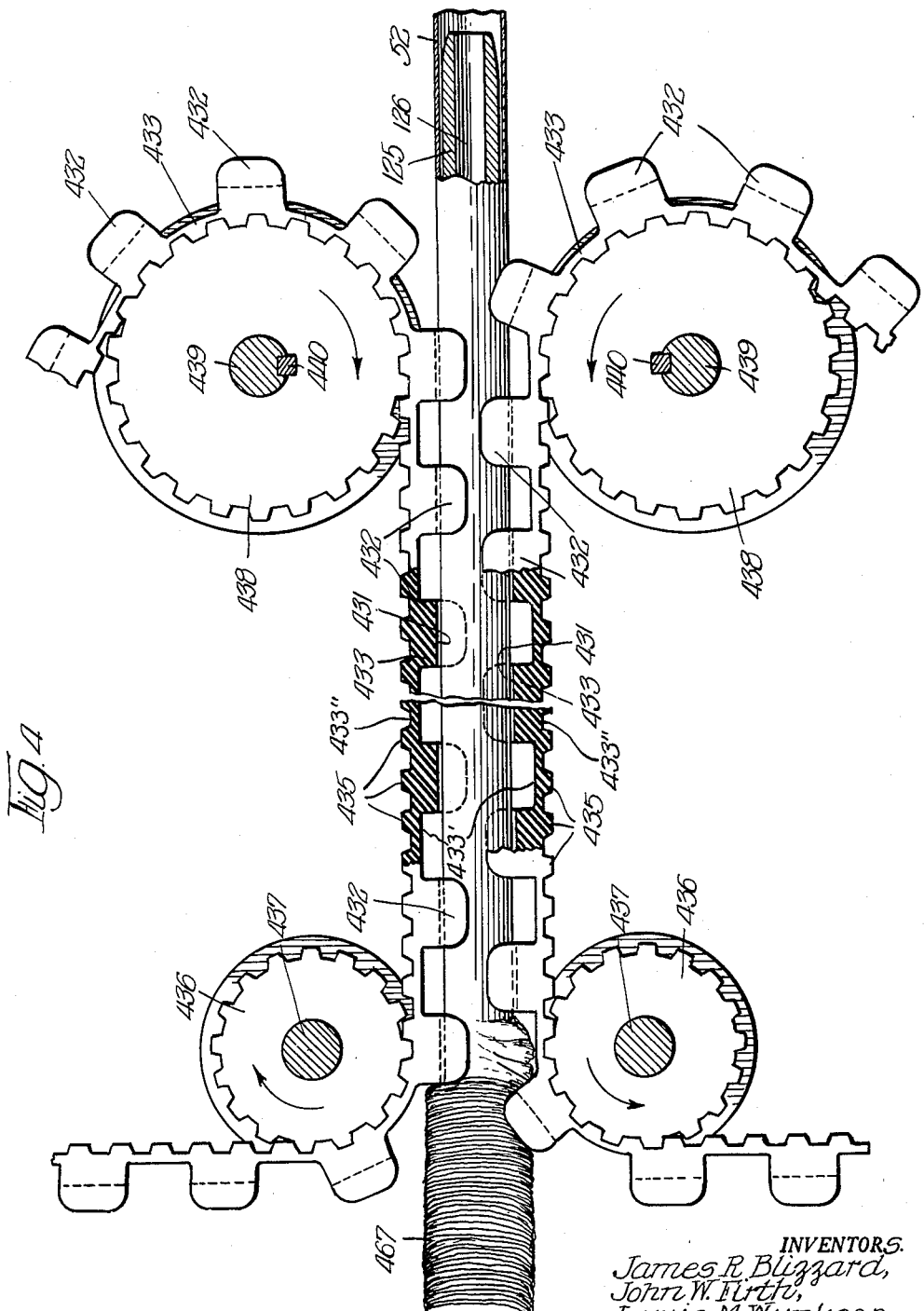

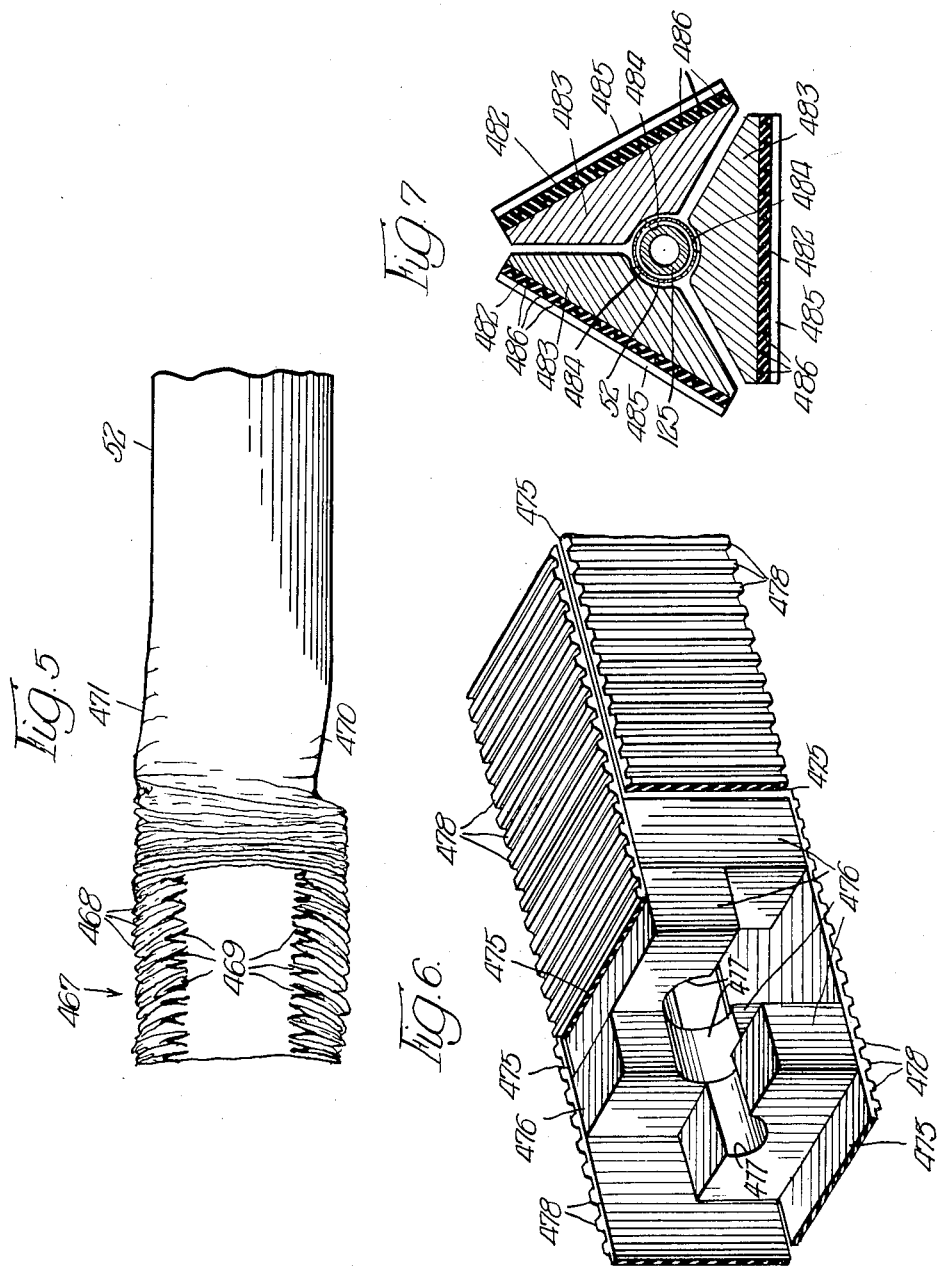

2,722,714

SHIRRING MACHINE

James R. Blizzard and John W. Firth, Chicago, and Lewis M. Wynkoop, Lyons, Ill., assignors to Tee-Pak, Inc., a corporation of Illinois Original application February 12, 1954, Serial No. 409,972. Divided and this application December 6, 1954, Serial No. 473,325

10 Claims. (Cl. 17—42)

This invention relates, generally, to the shirring of sausage casings. It has particular relation to apparatus and method for so doing and to the article formed thereby. The invention disclosed herein is an improvement over the invention disclosed in Korsgaard Patent No. 2,583,654, issued January 29, 1952, to the assignee of this application. This application is a division of application Serial No. 409,972, filed February 12, 1954.

The shirring machine shown in the Korsgaard patent comprises an intermittently operating shirring head arranged to cooperate with an intermittently operable turret. The turret includes four hollow mandrels, each associated with a compressor-doffer unit mounted in equal spaced relationship about the turret and arranged to be rotated about a horizontal axis. Mechanism is provided for advancing the compressor-doffer unit associated with a mandrel in the shirring position to move the mandrel through the shirring head and into the open and unshirred end of the casing which is to be shirred on the mandrel.

Air under slight pressure flows through the mandrel to inflate the casing and to maintain it in spaced relation to the mandrel and in such position that it can be grasped by the shirring dogs of the shirring head to effect the shirring operation. At a predetermined time in the cycle of operation, the shirring head is operated to shirr the casing onto the mandrel. At the same time the compressor-doffer unit is moved away from the shirring head and the mandrel is withdrawn therefrom. The actual shirring operation takes place between the retreating forward end of the compressor-doffer unit and the last set of shirring dogs in engagement with the casing. When a predetermined length of casing has been shirred onto the mandrel, the same is cut off.

Thereupon the turret is rotated through a quarter turn to move bodily the mandrel having the shirred casing thereon to the compressing position. In the compressing position, the mandrel is held stationary while the compressor-doffer unit is moved forwardly toward the shirring head to compress the shirred casing against a plate. Meanwhile the next mandrel has been moved into the shirring head and the next casing is being shirred onto the same. The next movement of the turret through a quarter turn merely causes the mandrel with the compressed casing thereon to be moved through a quarter turn and to be held in the compressed position while a third casing is being shirred upon the third mandrel.

Next the turret is again rotated through a quarter turn to a position where the casing which has been held in the compressed condition for two quarter turns of the turret can be doffed from its mandrel by a forward movement of the compressor-doffer unit. Meanwhile, a fourth casing is being shirred upon a fourth mandrel.

The shirring head of the Korsgaard patent comprises a pair of endless chains, one located above and the other below the inflated casing that is to be shirred upon a mandrel. Each chain carries a number of trucks and each truck carries a shirring dog that is provided with a generally semi-cylindrical opening along its width for engaging the opposite sides of the inflated casing to move it along the mandrel. The shirring operation then will be performed, as above described, between the forward end of the compressor-doffer unit and the last pair of shirring dogs which engage the casing. The trucks and shirring dogs for each chain are spaced apart along the casing a distance that is several times the width of the dog.

According to the Korsgaard patent, provision is made in the shirring head for guiding the trucks in such manner that the shirring dogs do not move relative to the casing to any appreciable extent. The reason for this is to avoid injury to the casing. Since the shirring dogs are mounted on the trucks which, in turn, are carried by chains, it necessarily follows that there must be a substantial distance between successive shirring dogs as described. For example, the distance between adjacent shirring dogs in the shirring head shown in the Korsgaard patent is of the order of six inches. Obviously, it is several times the width of a shirring dog along the casing. From a consideration of the various positions of the shirring dogs shown in Figures 9 and 9A of the Korsgaard patent, it will be apparent that there must be a substantial spacing between the adjacent shirring dogs in order to permit the described movement thereof. Thus there is an inherent limitation in the previous construction with respect to the spacing of the shirring dogs in contact with the inflated casing which is to be shirred upon the retreating mandrel.

The automatic shirring machine disclosed in the Korsgaard patent has made it possible to shirr automatically sausage casings. Experience has indicated that improvements can be made which will result in a better product that can be shirred at a higher speed and which can be utilized by the sausage stuffer more advantageously than was previously possible.

An analysis of the operation of the shirring head with the shirring dogs spaced apart several times their width, as in the Korsgaard patent, shows that the shirring of the casing takes place both in the section thereof immediately ahead of the last set of the shirring dogs in contact with the casing and also at the far end of the unshirred section of the casing and adjacent the previously shirred casing. For example, when the shirring dogs are spaced apart six inches, just after a set of shirring dogs has left the casing, there is an unshirred length of approximately six inches between the previously shirred portion of the casing and the next set of shirring dogs in engagement therewith. As this set of shirring dogs advances, initially shirring takes place in the inch to inch and a half section immediately ahead of them and also it takes place in the inch to inch and a half section at the opposite end of this six-inch length of casing adjacent to the previously shirred portion. The intervening three to four inches of the casing at this particular time is unshirred. As this set of shirring dogs advances, the unshirred intervening portion becomes shirred with the action being initiated from the ends.

Since it is not possible to hold the unshirred casing exactly symmetrically with respect to the shirring mandrel, there is a tendency for the shirring action to take place somewhat unsymmetrically, particularly at the intermediate portion of the six-inch length referred to. As a result, the outline of the folds or pleats presents an irregular or wavy line in contrast to a straight line or a cylindrical envelope with the cylinder being of uniform diameter from end to end. Moreover, because of the segregation in the shirring action at the ends of the six-inch lengths, there is a tendency for the casing, shirred as described, to separate slightly or for the shirred and compressed length of casing to be non-rigid or articulated at spaced locations therealong.

When it is recalled that a forty-foot length of casing is shirred and compressed to a length of six to eight inches, it will be appreciated that this segregation or articulation takes place at intervals which may be a few inches apart.

In applying such a casing to the stuffing horn, it is necessary for the operator to use both hands to hold the shirred and compressed casing in such position that the opening therethrough will be in registry with the stuffing horn. If this is not done, it is likely that the shirred and compressed casing will break over and hang downwardly from a portion already applied to the stuffing horn. This does not mean that the wall of the casing has been broken but rather that a portion of the shirred casing extends at an angle to the balance of it. If care is not taken, it is likely that the end of the stuffing horn will rupture the casing at this point.

Because of the irregularities in the shirring of sausage casings in the manner described, it has been found desirable to employ a relatively small mandrel onto which the casing is shirred. This leaves a correspondingly smaller diameter opening through the shirred casing and requires that a corresponding smaller diameter stuffing horn be employed. Where a larger mandrel is employed in connection with the shirring operation, a correspondingly larger diameter opening is left in the shirred casing. However, because of the irregularities referred to, it has been found that such a shirred casing is more likely to be ruptured than is the case where a smaller diameter mandrel is employed. The advantage of using the larger mandrel lies in the fact that it is possible then to leave a larger opening through the shirred casing and to apply it to a stuffing horn having a larger diameter. Then the casing can be stuffed at a higher rate than is possible when a smaller diameter stuffing horn is employed.

Among the objects of this invention are: To provide an improved means and method for shirring sausage casings and to provide an improved shirred casing; to reduce the distance between the shirring dogs in the shirring head while at the same time providing for the movement of the shirring dogs in non-interfering relation; to mount the shirring dogs on an endless belt with the shirring dogs formed integrally with and projecting only a slight distance from the belt; to perform the shirring operation on the casing as a substantially continuous operation rather than as a discontinuous or segregated operation; to form the folds or pleats in the casing in such manner that the same are substantially regularly formed from end to end; to interlock the successive folds or pleats so that the shirred and compressed casing is substantially rigid or is capable of supporting itself as a cantilever; and to provide for shirring a given casing on a larger diameter mandrel that has been previously accomplished while at the same time shirring the casing with such uniformity that there is little likelihood of damage thereto resulting from its having been shirred on the larger mandrel.

Other objects of this invention will, in part, be obvious and in part appear hereinafter.

This invention is disclosed in the embodiments thereof shown in the accompanying drawings, and it comprises the features of construction, combination of elements, arrangement of parts, method of operation, and new article of manufacture which will be exemplified in the construction, method and product hereinafter set forth and the scope of the application of which will be indicated in the appended claims.

For a more complete understanding of the nature and scope of this invention, reference can be had to the following detailed description, taken together with the accompanying drawings, in which:

Figure 1 is a view, in side elevation, of the shirring head for an automatic shirring machine in which the present invention is embodied, this figure corresponding, generally, to Figure 2A of the Korsgaard patent;

Figure 2 is a view, in side elevation at an enlarged scale, of the shirring head shown in Figure 1, this figure corresponding, generally, to that shown in Figure 5 of the Korsgaard patent;

Figure 3 is an end view of the shirring head looking toward the rear end of the machine from right to left as viewed in Figures 1 and 2, the shirring belts being shown in section, this view corresponding, generally, to Figure 8 of the Korsgaard patent, except that Figure 3 is taken looking from the opposite end of the shirring head;

Figure 4 is a view, partly in side elevation and partly in section, and shows the manner in which the shirring dogs integrally formed with the belts are guided for movement into and out of engagement with the casing to perform the shirring action thereon;

Figure 5 is a view, partly in side elevation and partly in section, at an enlarged scale showing how the major and minor pleats or folds are formed in interlocking relationship by the action of the shirring dogs which are offset from each other and are spaced relatively close together;

Figure 6 is a perspective view of a modified arrangement of shirring dogs and belts wherein four sets of shirring dogs and four sets of belts are employed for performing the shirring operation; and Figure 7 is a cross-sectional view of still another arrangement of shirring dogs and belts wherein three sets of shirring dogs mounted on three belts are employed for performing the shirring operation.

As pointed out hereinbefore the present invention is an improvement over the construction shown in the Korsgaard patent. In particular the improvement resides in the shirring head and the manner in which the shirring operation is performed. Generally the turret and other parts of the automatic shirring machine are essentially the same as set forth in the Korsgaard patent. Accordingly, the disclosure herein is directed to the particular improvements over the construction shown in the Korsgaard patent and only so much of that construction is illustrated herein as to afford a complete understanding of the nature and scope of the improvement. For a description of the turret and the general operation of the machine, reference can be had to the Korsgaard patent, which, by reference, is incorporated herein. In so far as possible the same reference characters are employed herein that are applied to the same or corresponding elements in the Korsgaard patent. In order to avoid confusion, the reference characters applied to the present improvement and not disclosed in the Korsgaard patent are greater than any reference characters employed in the Korsgaard description.

Referring now particularly to Figure 1 of the drawings, the reference character 1 is applied, generally, to an angle-iron welded frame which includes a rear bottom longitudinal angle 3, a rear intermediate angle 5, a rear top longitudinal angle 7, and rear upright angles 9. The remaining portions of the frame 1 are disclosed in more detail in Figure 1 of the Korsgaard patent to which reference is made for a more complete understanding of the same.

The frame 1 also includes transverse angles 10. Mounted on the rear top angle 7 and on a corresponding angle on the opposite side, shown in Figure 1 of the Korsgaard patent, is a plate 13 which carries a measuring roll 14. The measuring roll 14 is rotatably mounted between support plates 15 which also rotatably mount a squeeze roll 16. Cooperating with the measuring roll 14 is a metering disc 17 that is arranged to operate a measuring limit switch 18 for stopping further operation of the shirring head when a predetermined length of casing has been shirred by the shirring head.

As explained in greater detail in the Kosgaard patent, a tear limit switch is employed for stopping further operation of the shirring head in the event that the casing becomes torn. It is operated by a roller 22 which engages the upper side of the casing.

Mounted on the angle iron frame 1 are shirring head side plates 23 and 23' which constitute the framework for the shirring head, the details of construction of which will be described presently. Mounted on the side plates 23 and 23' is a shirring head motor 24 that is suitably controlled for starting, driving and stopping the shirring head which is shown generally at 48'. In the Korsgaard patent, the shirring head is referred to by this reference character without the prime and, in order to avoid confusion the similar reference character is here employed. However, it will be understood that the shirring head 48' is different in its construction and mode of operation from the shirring head shown in the Korsgaard patent.

The shirring head 48' is arranged to receive a relatively thin-walled cellulosic sausage casing 49 from a reel 50 that is rotatably mounted on a shaft 51. As the casing 49 comes from the reel 50, it is flat. It passes between the measuring roll 14 and the squeeze roll 16 and then is inflated as shown at 52. It will be observed that the squeeze roll 16 can be positioned by a handle 53. Immediately below the roller 22 which operates the tear limit switch and on the underside of the inflated casing 52 is a roller 54 which is carried by an arm 56. The roller 54 is employed to limit the downward movement of the roller 22 when the casing is deflated. The inflated casing 52 is directed into the shirring head 48' between guide rollers 57 which are mounted on vertical roller supports 58 that, in turn, are mounted on the ends of arms 59 which are secured to and extend from the plate 13. Using the shirring head 48' constructed as herein disclosed and with appropriate changes in the openings in the shirring dogs, it is possible to shirr a wide range of sizes of cellulosic sausage casings. The casings with which the present invention can be employed range in thickness from one thousandth to four thousandths of an inch and in length from about thirty to about sixty feet. While the reel 50 contains an indeterminate length of casing, the casing wound thereon is cut into lengths of the order from thirty to sixty feet, depending upon the requirements which lengths, it will be understood, are shirred onto a mandrel by the shirring head 48'. The internal diameter of the casing with which the present invention can be employed ranges from about sixteen thirty-seconds to about sixty thirty-seconds of an inch. The turret described in the Korsgaard patent is arranged to compress the shirred casing into a length from about six to about twelve inches with the casing being capable of being expanded to its full length when it is placed on a stuffing horn and is stuffed in accordance with the conventional stuffing practice.

As shown in Figure 1 underneath the shirring head 48', there is a sprocket 76 which drives a variable speed drive 77 which has an output sprocket 78 that is connected by a chain 79 to a sprocket 80 which drives the measuring roll 14 for withdrawing the flat casing 49 from the reel 50.

As shown in Figure 4, the inflated casing 52 is drawn over a mandrel 125 which has a central longitudinal aperture 126. Air under slight pressure flows through the aperture 126 and serves to inflate the casing 52 to its full diameter and thus facilitates the shirring operation. At the left-hand side of the shirring head 48' there is a front slide plate 168 which has an aperture 168' therein through which a collar 192 of a compressor-doffer unit projects at the time that the shirring operation is initiated for a given length of the inflated casing 52. As described in more detail in the Korsgaard patent, the mandrel 125 on which the inflated casing 52 is shirred is carried by a compressor-doffer unit of which the collar 192 forms a part and is movable therewith as the same recedes from the shirring head 48' under the control of the turret mechanism while the inflated casing 52 is being shirred on the mandrel.

Except for the reference to the particular shirring head 48', the apparatus thus far described is essentially the same as disclosed in the Korsgaard patent. Reference now will be had to the improvement of the present invention and the manner in which the inflated casing 52 is shirred in accordance therewith.

Referring now particularly to Figures 2, 3 and 4 of the drawings, it will be observed that generally semicircular openings 431 are formed in shirring dogs 432. The diameter of the openings 431 is governed by the diameter of the casing 52 that is to be shirred. For a larger diameter casing the openings 431 will have a correspondingly larger diameter. The shirring dogs 432 are formed of rubber and constitute integral parts of rubber belts 433, one of which is located above the casing 52 and the other is located therebelow. Reinforcing wires or fabric 434 extend lengthwise of the belts 433 to provide an inextensible construction. While the reinforcing wires 434 prevent stretching of the belts 433, they do not interfere with the flexibility thereof. The shirring dogs 432 project outwardly from the outer sides 433' of the belts 433. Since it is desired that the belts 433 run in predetermined relation to each other, teeth 435 are formed integrally therewith and extend therefrom on the side opposite the dogs 432 or from the inner sides 433'' of the belts 433 for interfitting with correspondingly spaced teeth of pinions 436 at the rear end of the shirring head 48' which are mounted on shafts 437 and with the teeth of pinions 438 at the front end of the shirring head 48' which are mounted on shafts 439. The pinions 436 function as guide means for the belts 433 to cause at least one dog 432 on each belt 433 to engage the casing 52.

It will be observed that the shafts 437 and 439 extend through the shirring head side plates 23 and 23' and are rotatably mounted thereon in suitable bearings. Since the pinions 438 are employed for driving the rubber belts 433, they are keyed to their respective shafts 439 by keys 440. In order to guide the rubber belts 433 around the pinions 436 and 438, they are provided, respectively, with radial flanges 442 and 444.

As shown more clearly in Figure 2, the belts 433 are also trained over pinions 445 which are rotatably mounted on shafts 446 that extend through the shirring head side plates 23 and 23'. These pinions have radially extending flanges 447 which insure that the belts 433 will not slip off.

Provision is made for varying the tensions of the belts 433 through the provision of pinions 448 which are carried by shafts 449. These pinions have flanges 450 for keeping the belts 433 from sliding off. The shafts 449 are mounted on slides 451 which are arranged to move up and down between guide plates 452 under the control of adjusting screws 453. It will be understood that the tension of the belts 433 can be adjusted by tightening or loosening the adjusting screws 453.

As shown in Figures 1, 2 and 4 of the drawings, the shirring dogs 432 formed integrally with the upper belt 433 are offset or staggered one dog with respect to the shirring dogs 432 of the lower belt 433. The reason for this will be described presently. The rubber dogs 432 which are formed integrally with the rubber belts 433 are spaced apart along the inflated casing 52 a distance equal to the widths of the shirring dogs therealong. For example, it has been found that highly satisfactory results are obtained employing shirring dogs 432 having a width along the casing 52 of three-quarters of an inch. Using the same spacing between the dogs, the spacing between the centers of the dogs is one and one-half inches. For illustrative purposes, it is pointed out that a belt 433 may have a length of forty-four inches in which case twenty-eight shirring dogs 432 would be employed. The teeth 435 in such case would be eighty-eight. Where the length of the belts 433 is forty-eight inches, thirty-two dogs on one and one-half inch centers would be employed and ninety-six teeth 435 would be used on the opposite side for engaging with the several pinions.

As pointed out the rubber belts 433 are driven by the pinions 438 which are keyed onto the shafts 439. The shirring head motor 24 is employed for this purpose and it is connected by a pair of V-belts 456 to pulleys 457, Figure 3, which are fast on the shaft 439. The drive to the upper pinion 438 is direct since it is mounted on the shaft 439. The drive to lower pinion 438 is through a gear 458, fast on the shaft 439 and a gear 459 meshing therewith that is fast on the lower shaft 439. Associated with the gear 459 is a sprocket 460 over which a chain 461 is trained for driving the sprocket 76 of the variable speed drive 77. The chain 461, as shown in Figure 1, is trained over guide sprockets 462 and 463 that are suitably mounted on the rear top longitudinal angle 7. In this manner the shirring head motor 24 not only drives the shirring head 48' but also through the variable speed drive 77 serves to withdraw the casing 49 from the reel 50.

At the beginning of the shirring operation, the collar 192 of the compressor-doffer unit occupies the position shown in Figure 2 of the drawings. In this position the mandrel 125 is located as shown in Figure 4 where it projects entirely through the shirring head 48'. The inflated casing 52 is shirred against a wall 466 of the collar 192 which recedes from the shirring head 48' as the shirring operation progresses. This movement of the collar 192 or of the wall 466, accompanied by movement of the mandrel 125 is controlled by the turret, all as described in the Korsgaard patent to which reference can be had for a more complete description of this phase of the operation of the automatic shirring machine. For performing the shirring operation, the pinions 436 and 438 are rotated in clockwise and counterclockwise directions as indicated by the arrows thereon in Figure 4. That is, the pinions 436 and 438 above the inflated casing 52 are rotated in a clockwise direction, while the pinions 436 and 438 below the casing 52 are rotated in the counterclockwise direction. Since the pinions 438 are the drive pinions, those portions of the rubber belts 433 immediately above and below the inflated casing 52 generally are in compression so that the shirring dogs 432 in contact engagement with the inflated casing 52 tend to push rather than pull on the same. This portion of the casing, as shown in Figure 2, is shirred between the receding wall 466 and the last shirring dog 432 in contact engagement with the inflated casing 52. No shirring action takes place in advance of the last shirring dog to contact the inflated casing 52. The illustration shown in Figure 5 of the shirred portion 467 of the inflated casing 52 indicates that major pleats or folds 468 are formed which are generally concave and nested with respect to each other in overlying relation to minor pleats or folds 469 which are located therebetween. After the inflated casing 52 has been shirred to form the major and minor pleats or folds 468 and 469, the shirred casing is compressed, as described in the Korsgaard patent, for a time sufficient to permit the shirred casing to take a set where the major and minor pleats or folds 468 and 469 are interlocked substantially from end to end of the shirred and compressed casing. It will be understood that the major pleats or folds 468, as shown in Figure 5, are exaggerated and that they are shown in pulled-apart relation in order to illustrate more clearly how they are formed and how they nest with respect to each other and overlie the minor pleats or folds 469.

Since the unshirred length of casing immediately ahead of the last shirring dog 432 to contact the inflated casing 52 and the previously shirred portion is relatively short, i. e., is only three-fourths of an inch for the construction previously described, the shirring action is initiated adjacent the previously shirred portion and continues to the portion of the casing in contact engagement with the next dog. As shown in Figure 5, that portion of the inflated casing 52 indicated at 470 is the one which is in contact with a shirring dog 432 while the diametrically opposite portion 471 is contact free. By employing the shirring dogs 432 which are spaced apart along the inflated casing 52, a distance about equal to the width of the shirring dogs and by using them in staggered relation thereby causing the shirring action to take place sequentially and continuously from opposite sides of the casing 52, it is possible to obtain the configuration of the major and minor pleats or folds 468 and 469 in Figure 5 that heretofore had not been possible. When this configuration subsequently is compressed in the turret as described in the Korsgaard patent, a relatively rigid, shirred and compressed casing is provided which is self-supporting as a cantilever. It is possible to grasp one end of this shirred and compressed casing and hold the same in a horizontal position without deformation or breaking of the casing. This facilitates threading on a stuffing horn. In addition, it is possible to employ a larger diameter of mandrel 125 with the result that it is possible to stuff the casing, shirred and compressed as described, at a faster rate.

Because of the sequential and continuous application of shirring force to opposite sides of the inflated casing 52 and over relatively short distances compared to the diameter of the casing, the folds or pleats 468 have a generally concave configuration as shown more clearly at the left-hand side of Figure 4 of the drawings. When the shirred casing with the overlapping folds or pleats subsequently is compressed, a relatively rigid construction from end to end in the shirred and compressed casing is provided which can be handled without articulation. In order to demonstrate the improved character of the shirred and compressed casing having the shirring operation performed as disclosed herein, a series of tests was run to compare casings shirred by the prior method with a casing shirred employing the belt with the integrally formed shirring dogs. For this purpose each shirred and compressed casing or strand was clamped firmly, but not tightly, into a laboratory burette clamp so that the casing or strand was supported horizontally at a point four inches from its free end. A paper cup was suspended from each shirred and compressed strand by means of a wire loop at a point one inch from its free end. Water was added to the cup slowly from a pipette until the shirred and compressed strand would no longer support the load. Then the cup and its contents were weighed. In nearly all instances the strand parted suddenly or became articulated with only a slight sagging. The results of the tests are here set forth:

*Grams required to break pleats*

| Test | Prior Shirring Head | Belt Shirring Head |
| --- | --- | --- |
| 1 | 15.8 | 45.5 |
| 2 | 14.0 | 79.9 |
| 3 | 22.4 | 77.0 |
| 4 | 17.9 | 91.4 |
| Average | 17.5 | 74.5 |

The casings employed for these tests were identical and had an inside diameter of twenty-seven thirty-seconds of an inch. In nearly every instance the pleats were broken at a point from one-half inch to one and one-half inches from the point of support for the strand which had been shirred using the prior method. For the strand employing the belt shirring head 48' of the present invention, the pleats were broken at immediately adjacent the point of support.

In Figure 6 of the drawings, there is illustrated another arrangement of belts for shirring cellulosic sausage casing in accordance with this invention. It will be observed that four belts 475 are shown, each of which is provided with a series of generally rectangularly shaped dogs 476 which are spaced apart along each belt approximately three times the width of a dog. The belts 475 and dogs 476 are formed integrally of rubber, the dogs being provided with generally semi-circular openings 477, the diameter of which depends upon the diameter of the casing to be shirred. Teeth 478 are formed integrally with the belts 475 on the sides opposite the dogs 476 for engagement with pinions in generally the same manner as described hereinbefore except that in this instance four set of pinions are employed rather than two sets. It will be noted that the belts 475 are spaced apart ninety degrees and that the shirring dogs 476 are staggered with respect to each other so that there is a contact-free space diametrically opposite each dog.

In Figure 7 of the drawings, three belts 482 are employed and they are spaced around the inflated casing 52, equiangularly at one hundred twenty degree intervals. Each of the belts 482 is formed preferably of rubber and has integrally formed therewith triangular shirring dogs 483 which have arcuate openings 484 for engaging the inflated casing 52. The triangular dogs 483 are staggered with respect to each other so that there is a contact-free area diametrically opposite each dog. Teeth 485 are formed integrally with the belts 482 on the sides opposite the dogs 483 for engagement with suitable sets of pinions which are mounted suitably around the mandrel 125 at one hundred twenty degree intervals. Reinforcing wires 486 extend through the belts 482 to make them substantially inextensible while permitting them to be relatively flexible.

Referring again to Figure 4 of the drawings, it will be observed that the belts 433 are trained over relatively small diameter pinions 436 and that the shirring dogs 432 are moved rapidly away from the vicinity of the shirred casing after they have performed their shirring function. It is desirable to move the dogs 432 away from the shirred casing at an angle of 90° or greater rather than at an acute angle in order to obtain proper shirring action.

In the various embodiments of the invention where the belts are illustrated, provision is made for driving them in synchronism through the use of the pinions and teeth on the sides of the belts opposite the dogs. Using such an arrangement, it is possible to run the belts in exact synchronism. However, separate drives for the belts can be employed and provision can be made for running one belt slightly faster than the other so that there is a random relationship between the shirring dogs on opposite sides of the casing. Also it is possible to use one belt having the teeth for engagement with a drive pinion and the other belt to be smooth and to be driven by friction. Also it is possible to employ two belts or more belts all driven by friction.

While the dogs have been described as having semi-circular openings and surfaces for engagement with the casing, it is possible to employ other shapes. For example, the surface of the dogs in contact with the casing can be a portion of an ellipse. A corresponding change is effected in the shirred casing. Also it is possible to employ other configurations so that the shirred strand or casing, instead of being circular in cross-section, will have a polygonal cross-section, such as a square or a hexagon.

Since certain further changes can be made in the foregoing article, method and construction, it is intended that all matter shown in the accompanying drawings and described hereinbefore shall be interpreted as illustrative and not in a limiting sense.

What is claimed as new is:

1. In a machine for shirring thin-walled cellulosic sausage casings and the like having a mandrel with a cooperating relatively receding wall and a shirring head in cooperative relation therewith for shirring said casings thereon and against said wall, in combination, a plurality of sets of shirring dogs in cooperative relation around said casing, support means on said shirring head for each set of dogs maintaining them in uniform spaced relation at a distance apart along the casing about equal to the width of a dog along said casing, guide means on said shirring head for said support means positioned to cause at least one dog of each set to engage said casing, and driving means operatively connected to said support means to move said dogs successively into contact engagement with said casing and toward said relatively receding wall to shirr said casing thereagainst and onto said mandrel.

2. In a machine for shirring thin-walled cellulosic sausage casings and the like having a mandrel with a cooperating relatively receding wall and a shirring head in cooperative relation therewith for shirring said casings thereon and against said wall, in combination, a plurality of sets of shirring dogs in cooperative relation around said casing, support means on said shirring head formed integrally with each set of dogs for maintaining them in uniform spaced relation at a distance apart about equal to the width of a dog along the casing, guide means on said shirring head for said support means positioned to cause at least one dog of each set to engage said casing, and driving means operatively connected to said support means to move said dogs successively into contact engagement with said casing and toward said relatively receding wall to shirr said casing thereagainst and onto said mandrel.

3. The invention, as set forth in claim 2, wherein there are three sets of shirring dogs, and endless belts constitute the support means one for each set of shirring dogs and they are spaced equiangularly around said mandrel with a portion of each in parallel relation thereto to cause the dogs along said portion to have contact engagement with the casing.

4. The invention, as set forth in claim 2, wherein there are four sets of shirring dogs, and endless belts constitute the support means one for each set of shirring dogs and they are spaced equiangularly around said mandrel with a portion in parallel relation thereto to cause the dogs along said portion to have contact engagement with the casing.

5. In a machine for shirring thin-walled cellulosic sausage casings and the like having a mandrel with a cooperating relatively receding wall and a shirring head in cooperative relation therewith for shirring said casings thereon and against said wall, in combination, two sets of shirring dogs in cooperative relation around said casing, support means for said shirring dogs in the form of endless belts one for each set for maintaining them in uniform spaced relation with a portion of each belt being disposed on opposite sides of and in parallel relation to said mandrel to cause the dogs carried thereby to have contact engagement with the casing and with the dogs of one set in offset relation with respect to the dogs of the other set whereby when a dog of one set is applying shirring force to the casing no shirring force is applied thereto on the diametrically opposite side, said dogs projecting from the outer sides of said belts and the inner sides thereof having teeth projecting therefrom, toothed guide means on said shirring head for said belts over which the same are trained, and driving means operatively connected to said belts to move said dogs successively into contact engagement with said casing and toward said relatively receding wall to shirr said casing thereagainst and onto said mandrel.

6. In a machine for shirring thin-walled cellulosic sausage casings and the like having a mandrel with a cooperating relatively receding wall and a shirring head in cooperative relation therewith for shirring said casings thereon and against said wall, in combination, two sets of shirring dogs in cooperative relation around said casing, support means for said shirring dogs in the form of endless belts one for each set for maintaining them in uniform spaced relation with a portion of each belt being disposed on opposite sides of and in parallel relation to said mandrel to cause the dogs carried thereby to have contact engagement with the casing, said dogs being formed integrally with and projecting from the outer sides of said belts and the inner sides thereof having teeth formed integrally therewith and projecting therefrom, toothed guide means on said shirring head for said belts over which the same are trained, and driving means operatively connected to said belts to move said dogs successively into contact engagement with said casing and toward said relatively receding wall to shirr said casing thereagainst and onto said mandrel.

7. In a machine for shirring thin-walled cellulosic sausage casings and the like having a mandrel with a cooperating relatively receding wall and a shirring head in cooperative relation therewith for shirring said casings thereon and against said wall, in combination, two sets of shirring dogs in cooperative relation around said casing, support means for said shirring dogs in the form of endless belts one for each set for maintaining them in uniform spaced relation with a portion of each belt being disposed on opposite sides of and in parallel relation to said mandrel to cause the dogs carried thereby to have contact engagement with the casing and with the dogs of one set in offset relation with respect to the dogs of the other set whereby when a dog of one set is applying shirring force to the casing no shirring force is applied thereto on the diametrically opposite side, said dogs projecting from the outer sides of said belts and the inner sides thereof having teeth projecting therefrom, guide means on said shirring head for said belts in the form of pinions over which the same are trained, gear means cooperating with a pinion for each belt and with each other to cause the same to move in synchronism, and driving means operatively connected to said gear means to move said belts and thereby said dogs successively into contact engagement with said casing and toward said relatively receding wall to shirr said casing thereagainst and onto said mandrel.

8. In a machine for shirring thin-walled cellulosic sausage casings and the like having a mandrel with a cooperating relatively receding wall and a shirring head in cooperative relation therewith for shirring said casings thereon and against said wall, in combination, two sets of shirring dogs in cooperative relation around said casing, support means for said shirring dogs in the form of endless belts one for each set for maintaining them in uniform spaced relation with a portion of each belt being disposed on opposite sides of and in parallel relation to said mandrel to cause the dogs carried thereby to have contact engagement with the casing, said dogs being formed integrally with and projecting from the outer sides of said belts and the inner sides thereof having teeth formed integrally therewith and projecting therefrom, guide means for said belts including at least two pinions for each belt one of which is positioned adjacent said receding wall at the start of the shirring operation and the other is remote therefrom and they cooperate respectively with the respective belt to direct the dogs thereof in their movement out of contact engagement with the casing and into contact engagement therewith, gear means cooperating with said remotely located pinions to cause said belts to move in synchronism, and driving means operating through said gear means to move said belts and thereby said dogs successively into contact engagement with said casing and toward said relatively receding wall to shirr said casing thereagainst and onto said mandrel.

9. In a machine for shirring thin-walled cellulosic sausage casings and the like having a mandrel with a cooperating relatively receding wall and a shirring head in cooperative relation therewith for shirring said casings thereon and against said wall, in combination, a plurality of sets of shirring dogs in cooperative relation around said casing, support means on said shirring head for each set of dogs maintaining them in uniform spaced relation along the casing with the dogs of one set in offset relation with respect to the dogs of the next set whereby when a dog of one set is applying shirring force to the casing no shirring force is applied thereto on the diametrically opposite side, guide means on said shirring head for said support means positioned to cause at least one dog each set to engage said casing as aforesaid, and driving means operatively connected to said support means to move said dogs successively into contact engagement with said casing and toward said relatively receding wall to shirr said casing thereagainst and onto said mandrel.

10. In a machine for shirring thin-walled cellulosic sausage casings and the like having a mandrel with a cooperating relatively receding wall and a shirring head in cooperative relation therewith for shirring said casings thereon and against said wall, in combination, two sets of shirring dogs in cooperative relation around said casing, support means for said shirring dogs in the form of endless belts one for each set for maintaining them in uniform spaced relation with a portion of each belt being disposed on opposite sides of and in parallel relation to said mandrel to cause the dogs carried thereby to have contact engagement with the casing, said dogs projecting from the outer sides of said belts and the inner sides thereof having teeth projecting therefrom, guide means for said belts in the form of pinions over which the same are trained, gear means cooperating with a pinion for each belt and with each other to cause the same to move in synchronism, said belts being positioned on said pinions with the dogs of one set offset with respect to the dogs of the other set whereby when a dog of one set is applying shirring force to the casing no shirring force is applied thereto on the diametrically opposite side, and driving means operating through said gear means to move said belts and thereby said dogs successively into contact engagement with said casing and toward said relatively receding wall to shirr said casing thereagainst and onto said mandrel.

References Cited in the file of this patent
UNITED STATES PATENTS

| | | |
|---|---|---|
| 2,010,626 | Dietrich | Aug. 6, 1935 |
| 2,583,654 | Korsgaard | Jan. 29, 1952 |